United States Patent
Smith et al.

(10) Patent No.: US 10,223,139 B2
(45) Date of Patent: Mar. 5, 2019

(54) DYNAMICALLY DEPLOYABLE WIRELESS INFRASTRUCTURE IN CLOUD ENVIRONMENT

(71) Applicant: The Trustees Of The University Of Pennsylvania, Philadelphia, PA (US)

(72) Inventors: Jonathan M. Smith, Princeton, NJ (US); Eric R. Keller, Louisville, CO (US); Thomas W. Rondeau, Shelburne, VT (US); Kyle B. Super, Bethlehem, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 97 days.

(21) Appl. No.: 14/212,975

(22) Filed: Mar. 14, 2014

(65) Prior Publication Data

US 2014/0282544 A1    Sep. 18, 2014

Related U.S. Application Data

(60) Provisional application No. 61/798,110, filed on Mar. 15, 2013.

(51) Int. Cl.
*G06F 9/455* (2018.01)
*H04W 8/00* (2009.01)
(Continued)

(52) U.S. Cl.
CPC .......... *G06F 9/455* (2013.01); *G06F 9/45537* (2013.01); *H04L 69/18* (2013.01);
(Continued)

(58) Field of Classification Search
None
See application file for complete search history.

(56) References Cited

U.S. PATENT DOCUMENTS 5,293,382 A * 3/1994 Carson ............... H04J 1/05
                                              370/210
6,480,535 B1 * 11/2002 Witmayer .......... H03H 17/0275
                                              375/232

(Continued)

FOREIGN PATENT DOCUMENTS

EP        1503603        2/2005
WO    WO 2006-026336    3/2006
(Continued)

OTHER PUBLICATIONS

Rondeau et al, Cognitive Radio Formulation and Implementation, 2006, IEEE, pp. 1-10 (Year: 2006).*

(Continued)

*Primary Examiner* — Abu Ghaffari
(74) *Attorney, Agent, or Firm* — Baker & Hostetler LLP

(57) ABSTRACT

CRYSTAL "Cognitive radio you share, trust and access locally" (CRYSTAL) is a virtualized cognitive access point that may provide for combining multiple wireless access applications on a single hardware platform. Radio technologies such as LTE, WiMax, GSM, and the like can be supported. CRYSTAL platforms can be aggregated and managed as a cloud, which provides a model for access point sharing, control, and management. CRYSTAL may be used for scenarios such as neighborhood spectrum management. CRYSTAL security features allow for home/residential as well as private infrastructure implementations.

9 Claims, 8 Drawing Sheets

(51) Int. Cl.
   *H04L 29/06* (2006.01)
   *H04W 88/10* (2009.01)
   *G06F 9/50* (2006.01)
   *G06F 11/14* (2006.01)

(52) U.S. Cl.
   CPC ........... *H04W 88/10* (2013.01); *G06F 9/5077* (2013.01); *G06F 11/1484* (2013.01); *G06F 2201/815* (2013.01)

(56) References Cited

U.S. PATENT DOCUMENTS

| | | | |
|---|---|---|---|
| 7,151,925 B2 | 12/2006 | Ting et al. | |
| 7,675,985 B1* | 3/2010 | Watson | H04L 5/0044 370/464 |
| 8,054,779 B2 | 11/2011 | Hassan et al. | |
| 8,184,653 B2* | 5/2012 | Dain | H04W 16/14 370/431 |
| 9,054,838 B1* | 6/2015 | Harris | H04L 7/0037 |
| 2004/0029575 A1 | 2/2004 | Mehta | |
| 2004/0042557 A1* | 3/2004 | Kabel | H03H 17/0266 375/260 |
| 2005/0259724 A1* | 11/2005 | Bergstrom | H04B 1/7075 375/150 |
| 2005/0276335 A1* | 12/2005 | Kumar | H03H 17/0213 375/260 |
| 2008/0146178 A1* | 6/2008 | Lu | H04B 1/0014 455/187.1 |
| 2008/0209415 A1* | 8/2008 | Van Riel | G06F 9/45533 718/1 |
| 2008/0293353 A1* | 11/2008 | Mody | H04K 3/44 455/1 |
| 2009/0040997 A1* | 2/2009 | Oh | H04N 21/4382 370/345 |
| 2009/0154534 A1* | 6/2009 | Hassan | H04L 1/0019 375/219 |
| 2009/0170472 A1* | 7/2009 | Chapin | H04W 28/18 455/410 |
| 2009/0321065 A1* | 12/2009 | Vinson | E21B 33/1216 166/101 |
| 2010/0333088 A1* | 12/2010 | Rogel | G06F 9/45533 718/1 |
| 2011/0035522 A1* | 2/2011 | Tan | G06F 13/28 710/107 |
| 2011/0249769 A1* | 10/2011 | Kang | H04L 25/03038 375/296 |
| 2011/0302390 A1* | 12/2011 | Copeland | G06F 9/5061 712/2 |
| 2011/0321065 A1* | 12/2011 | Gopalakrishnan | G06F 9/545 719/328 |
| 2012/0082457 A1* | 4/2012 | Yang | H04B 10/616 398/65 |
| 2012/0154213 A1* | 6/2012 | Bull | G01S 5/0215 342/357.25 |
| 2012/0159454 A1* | 6/2012 | Barham | G06F 9/45558 717/128 |
| 2012/0226740 A1* | 9/2012 | Nath | H04L 67/125 709/203 |
| 2012/0290702 A1* | 11/2012 | Vincent | G06F 9/45558 709/223 |
| 2012/0297379 A1* | 11/2012 | Anderson | G06F 9/45558 718/1 |
| 2013/0023201 A1 | 1/2013 | Coleman et al. | |
| 2013/0086202 A1* | 4/2013 | Connelly | G06F 9/45558 709/217 |
| 2013/0210483 A1* | 8/2013 | Zimmer | G06F 9/5077 455/552.1 |
| 2014/0010171 A1* | 1/2014 | Morrill | H04W 88/10 370/329 |
| 2014/0153674 A1* | 6/2014 | Stratigos, Jr. | H04L 27/06 375/340 |
| 2014/0259169 A1* | 9/2014 | Harrison | G06F 21/554 726/23 |
| 2014/0337843 A1* | 11/2014 | Delamare | H04B 3/542 718/1 |
| 2015/0156122 A1* | 6/2015 | Singh | H04L 47/20 370/235 |

FOREIGN PATENT DOCUMENTS

| | | |
|---|---|---|
| WO | WO 2008-115298 | 9/2008 |
| WO | WO 2008-140967 | 11/2008 |
| WO | WO 2009-079152 | 6/2009 |

OTHER PUBLICATIONS

Marc Anthony Padilla, FM Demodulators in Software-Defined Radio Using FPGAs with Rapid Prototyping, 2011, Brigham Young University, pp. 1-67 (Year: 2011).*

Harris et al, Digital Receivers and Transmitters Using Polyphase Filter Banks for Wireless Communications, 2002, IEEE, pp. 1-40 (Year: 2002).*

Surducan et al, Multiband Antennas for SDR Applications, 2009, Hindawi Publishing Corporation, International Journal of Digital Multimedia Broadcasting vol. 2009, pp. 1-9 (Year: 2009).*

SDR Forum, Quantifying the Benefits of Cognitive Radio, 2010, Wireless Innovation.org, SDR Forum Version 2.0, pp. 1-238 (Year: 2010).*

Arye et al, "Increasing Network Resilience Through Edge Diversity in NEBULA", Mobile Computing and Communications Review, Jul. 2012, 16(3), 1-7 pages.

Bhanage et al, "Virtual Basestation: Architecture for an Open Shared WiMAX Framework", Proceedings of the Second ACM SIGCOMM Workshop on Virtualized Infrastructure Systems and Architectures, Sep. 3, 2010, pp. 1-8.

Chen et al, Polyphase Filter Bank for Unequal Channel Bandwidths and Arbitrary Center Frequencies-I. In SDR Tech. Conference and Product Exposition, 2010, 143-147.

* cited by examiner

DYNAMICALLY DEPLOYABLE WIRELESS INFRASTRUCTURE IN CLOUD ENVIRONMENT

CROSS-REFERENCE TO RELATED APPLICATIONS

This application claims the benefit of U.S. Provisional Patent Application No. 61/798,110, filed on Mar. 15, 2013, entitled "APPARATUS, METHOD, AND SYSTEM TO DYNAMICALLY DEPLOY WIRELESS INFRASTRUCTURE," the contents of which are hereby incorporated by reference herein.

TECHNICAL FIELD

The technical field generally relates to radio access technologies and more specifically relates to dynamically deployable radio access technology.

BACKGROUND

Wireless communications growth is characterized both by the increasing number of wireless devices such as smartphones, and their diversity (in both access method and applications). Computation is also evolving, towards a model based on networked access to distributed data and services. Today's wireless access is driven by user demand for convenient and continuous mobile access to services such as search, online social networks, location-based services, etc.

New usage and demands for higher application bandwidths is outrunning the growth in capacity of the wireless infrastructure. Some studies of these growth rates project significantly exceeding a capacity limit by 2016 with potential negative consequences that include dropped calls, congestion, slow download speeds, as well as increased deployment and operating costs.

Various approaches to these capacity problems exist. Signal-processing approaches that can better exploit available capacity continue to be developed, but large gains in performance (bits/Hz/meter$^2$) are hard to obtain. Capacity improvements are technically easier to obtain through spatial diversity, but deploying ubiquitous access points that cover smaller areas is inherently expensive, and results in a profusion of specialized access points, each with a single purpose (e.g., for LTE, WiMax, GSM, or Wi-Fi). Deploying a large number of access points has been difficult, evident from the slow rate of femtocell adoption. Once deployed, access points remain in service for long periods of time and rarely evolve, inhibiting deployment of new protocols.

A second and often-neglected issue in deployment is the local wireless environment. Today, cellular carriers traverse neighborhoods measuring coverage to locate and fill holes as necessary, but this costly and manpower-intensive process is difficult to replicate for home-deployed femtocells. Even knowledgeable home users may have difficulty locating (and obtaining good throughput from) their Wi-Fi routers due, for example, to interference.

SUMMARY

Disclosed herein are the designs and implementations of "cognitive radio you share, trust and access locally" (CRYSTAL), a virtualized cognitive access point. CRYSTAL provides for combining multiple wireless access applications on a single hardware platform. Radio technologies such as LTE, WiMax, GSM, and the like can be supported. CRYSTAL platforms can be aggregated and managed as a cloud, providing a model for access point sharing, control, and management. CRYSTAL may be used for scenarios such as neighborhood spectrum management.

In an embodiment, a device includes a processor and a memory coupled with the processor. The memory has executable instructions that when executed by the processor cause the processor to effectuate operations that include: creating a first virtual machine comprising a first virtual radio application with a first radio stack and a corresponding first operating system; creating a second virtual machine comprising a second virtual radio application with a second radio stack and a corresponding second operating system, wherein the first virtual machine and the second virtual machine are logically separate and distinct; and creating a virtualization layer communicatively connected with the first virtual machine and the second virtual machine.

In an embodiment, a computer readable storage medium includes executable instructions that when executed by a computing device cause said computing device to perform the instructions, which include: creating a first virtual machine comprising a first virtual radio application with a first radio stack and a corresponding first operating system; creating a second virtual machine comprising a second virtual radio application with a second radio stack and a corresponding second operating system, wherein the first virtual machine and the second virtual machine are logically separate and distinct; and creating a virtualization layer communicatively connected with the first virtual machine and the second virtual machine.

In an embodiment, a system includes a shared wireless device communicatively connected with a cloud manager device. The shared wireless device memory has stored thereon executable instructions that when executed by the processor cause the processor to effectuate operations comprising: creating a first virtual machine comprising a first virtual radio application with a first radio stack and a corresponding first operating system; creating a second virtual machine comprising a second virtual radio application with a second radio stack and a corresponding second operating system, wherein the first virtual machine and the second virtual machine are logically separate and distinct; and creating a virtualization layer communicatively connected with the first virtual machine and the second virtual machine. The cloud manager device memory has stored thereon executable instructions that when executed by the cloud manager device processor cause the cloud manager device processor to effectuate operations including: receiving, by an application provider device, a request that comprises features for a device that comprises a combination of a location, a frequency, a bandwidth, an antenna direction, or an antenna power; and providing, based on the request, a response to the application provider device that lists the shared wireless device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF THE INVENTION

Rather than multiple provider-specific static networks being used to solve the costs of wireless communication growth, another solution is a shared network. In an embodiment, a single infrastructure provider provisions and manages a large network and then lets individual carriers use that infrastructure. This may minimize the need for a wireless carrier to deploy and manage equipment and reduce the need to predict usage. The wireless service provider may deploy a virtual base station on-demand to dynamically alter the footprint of the service or add capacity when and where needed (and subsequently un-deploy that base station when it is no longer needed). Herein we discuss virtualizing not only the computing resources of a base station, but also virtualizing the radio itself so that wireless service providers may deploy new base stations. The virtualization layer isolates individual virtual base stations.

Discussed herein is a "cognitive radio you share, trust and access locally" architecture (hereinafter CRYSTAL). A device using a CRYSTAL (CRYSTAL device) is capable of running virtual radio applications from multiple service providers (e.g., a femtocell for cell phone carriers, a value-added Wi-Fi router from an Internet provider, and a Wi-Fi router from researchers deploying a newly proposed protocol).

A cloud of CRYSTAL devices deployed with great spatial diversity (e.g., in homes) can provide a scalable, flexible wireless edge for a network which accommodates: (i) the ability to dynamically alter a footprint of a wireless network, (ii) emerging phenomena such as the Internet of Things, (iii) organic deployments of a new protocol such that the protocol can evolve with use, and (iv) value added services to be coupled to existing standards. In doing so, CRYSTAL addresses deployment challenges such as lifetime cost, updates, and device proliferation. Additionally, CRYSTAL aids users in positioning devices to maximize system performance.

Figure 1:
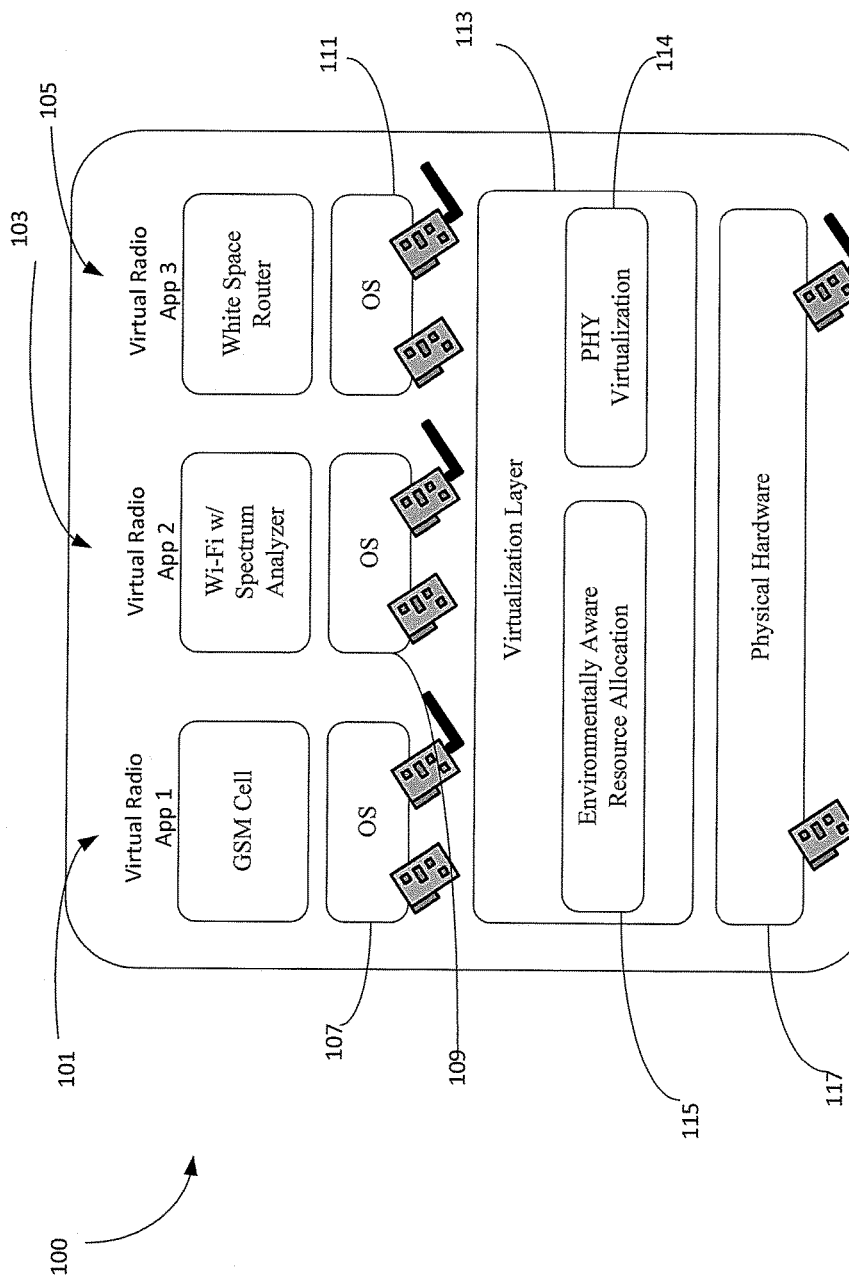
FIG. 1 illustrates an architecture which enables multiple, diverse, wireless applications to be run concurrently.

FIG. 1 illustrates an exemplary block diagram 100 of a CRYSTAL device. CRYSTAL allows for a shared physical hardware (radio hardware) and virtualization layer, as well as isolation of virtual radio applications via a virtual machine (VM). Three exemplary virtual radio applications are illustrated in FIG. 1. VM 101 provides for use of Global System for Mobile Communications (GSM) wireless technology and includes corresponding operating system 107. VM 103 provides for use of Wi-Fi wireless technology and includes corresponding operating system 109. VM 105 provides for use of white space wireless technology and includes corresponding operating system 111. Virtual machine (VM) technology may be used to isolate virtual radio applications and enable them to have full control over the entire software radio stack. Each virtual radio application is presented with a virtual radio device. The applications interact with the virtualized device as if it were a physical device (e.g., providers can run unmodified GNU Radio applications).

Diagram 100 shows a virtualization layer 113 that comprises environmentally aware resource allocation 115 and PHY virtualization layer 114. In cognitive radio, applications can be made aware of external resources such as spectrum occupancy, types of signals and interference, location, etc. Because CRYSTAL provides an abstraction layer through the PHY virtualization to the radio hardware 117, each virtual machine can request resources that help enable cognitive decision making. PHY virtualization layer 114 separates and combines the signal streams from each virtual radio application. For example, with CRYSTAL polyphase filtering techniques may be used for its efficiency. It should also be clear that the lower set of cards 117 are the only physical hardware; the rest are virtual.

Further details are disclosed herein regarding a model for deployment where collections of deployed CRYSTAL devices can form an elastic cloud, which lowering barriers to deployment, improve management via dynamically modifying the footprint of a wireless network, and providing access for diagnostic measurements with minimal predeployed infrastructure requirements. An architecture which includes a cross-layer virtualization of both host and radio resources is disclosed, with advantages for evolvability (and hence lifetime cost), as well as security based on resource isolation. Also disclosed is the use of multiple communication "stacks" that can be run simultaneously, alongside applications acting solely as sensors and an evaluation demonstrating the isolation and scalable performance even when operating multiple applications with varying waveforms.

Figure 2:
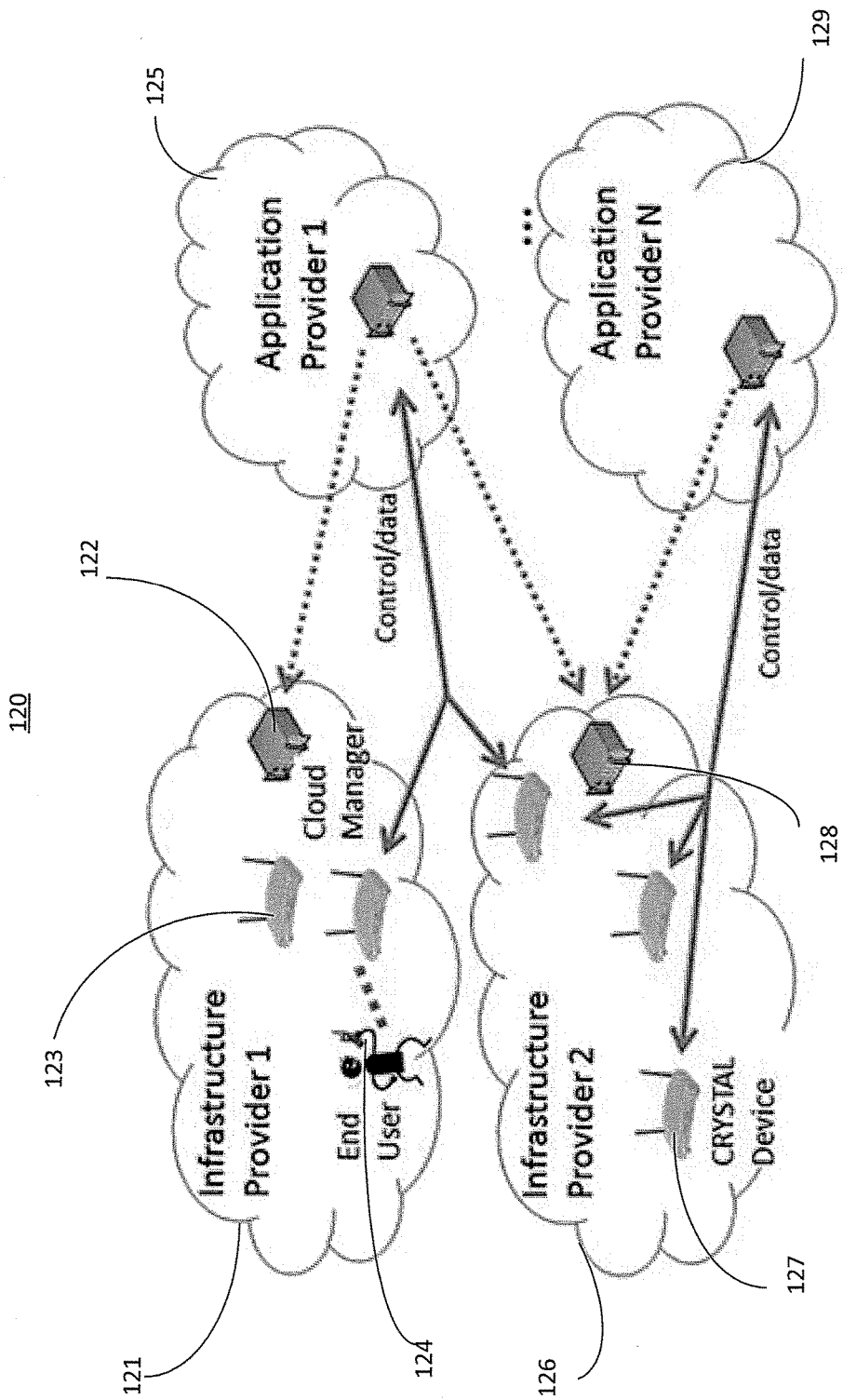
FIG. 2 is an exemplary illustration of architecture of a cloud network with devices that comply with a cognitive radio you share, trust and access locally architecture.

Hosted cloud infrastructures demonstrate the value and cost-effectiveness of a dynamically expandable infrastructure to application developers versus provisioning enough equipment for peak predicted demand. A cloud of CRYSTAL devices (e.g., a network with multiple CRYSTAL devices) provides similar benefits for network access capabilities. FIG. 2 illustrates an architecture of a CRYSTAL cloud.

FIG. 2 illustrates an exemplary system 120 comprising CRYSTAL devices. Analogous to cloud computing, there may be infrastructure providers that own and manage the physical devices. There is an infrastructure provider 121 and infrastructure provider 126 that are communicatively connected with application provider 125 or application provider 129. CRYSTAL device 123 is communicatively connected with end user device 124, CRYSTAL cloud manager 122, application provider 125, and application provider 129. CRYSTAL device 127 is communicatively connected with CRYSTAL cloud manager 128, application provider 129, and application provider 125. CRYSTAL cloud manager 122 and CRYSTAL cloud manager 128 are devices that may help manage the deployment of applications on CRYSTAL device, among other things. Infrastructure provider 121 or 126 may lease access to CRYSTAL device 127 and CRYSTAL device 123 to application provider 125 or application provider 129. Application provider 125, for example, may create and manage the virtual radio application and provide service via CRYSTAL device 123 to end user device 124.

In practice, there may be multiple infrastructure providers that each own a set of CRYSTAL devices. The infrastructure provider may physically own and operate a network of CRYSTAL devices or act as a broker to others that own the CRYSTAL devices. As discussed in more detail herein, a local Internet service provider (ISP) which provides its customers with a CRYSTAL device, such as a wireless router, may also become an infrastructure provider.

Each infrastructure provider may have its own management tools and interfaces. However, the application providers may lease resources directly from the infrastructure providers or use some aggregating service which unifies the interface across providers. The application provider or aggregating service interacts with the cloud manager of the given infrastructure provider to request resources from that infrastructure provider.

Figure 3:
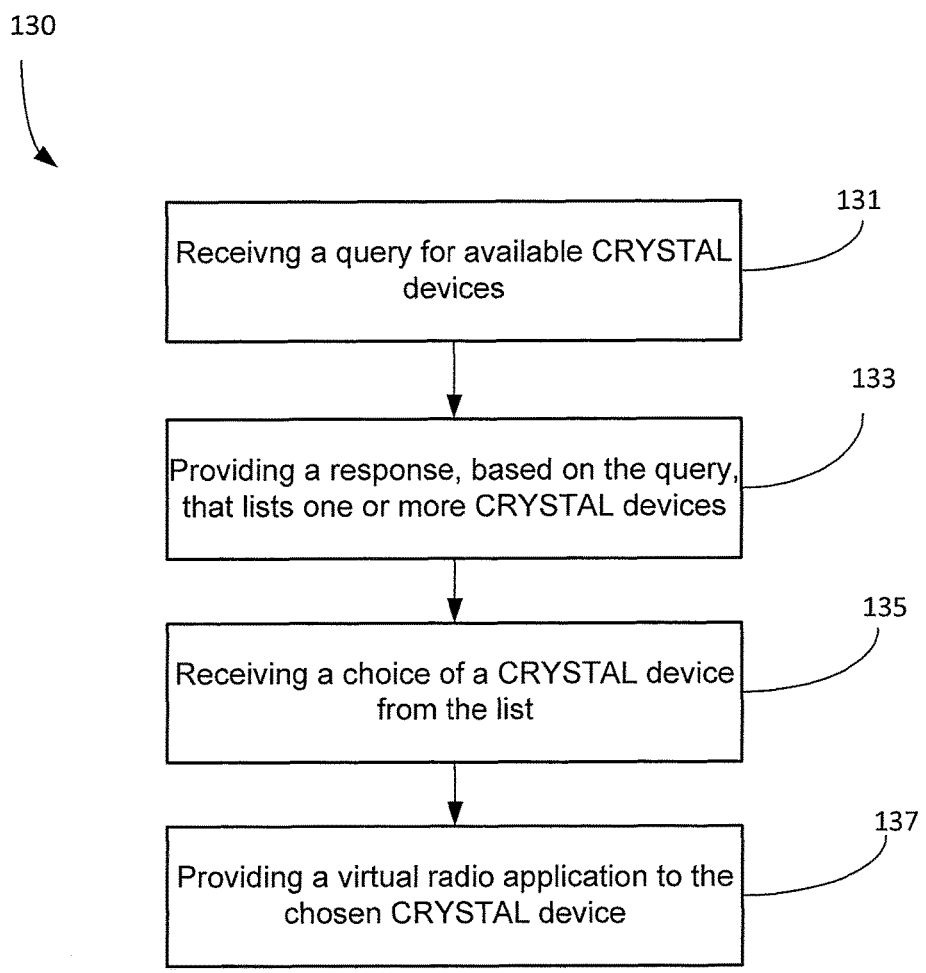
FIG. 3 illustrates an exemplary method for implementing a cloud network with devices that comply with a cognitive radio you share, trust and access locally architecture.

FIG. 3 illustrates an exemplary method 130 for managing an infrastructure with CRYSTAL devices. At block 131, a request may be received for available CRYSTAL devices. A CRYSTAL cloud manager or the like may receive the request. The request may include particular requirements or preferred features for a CRYSTAL device, such as location, frequency, bandwidth, antenna direction, or antenna power, among other things. At block 133, a response may be provided that includes one or more CRYSTAL devices that are based on the request at block 131. The CRYSTAL cloud manager, or the like may provide the response. The CRYSTAL devices may be held (reserved) for the requester (e.g., an application provider device) for a period.

At block 135, a choice of one or more CRYSTAL devices out of the provided choices of CRYSTAL device may be received. A CRYSTAL cloud manager may receive the choice and manage this process for executing the choice. At block 137, application authorized by the application provider for the chosen CRYSTAL devices will be forwarded and installed on the appropriate CRYSTAL devices. The application performs some radio application—whether communicating with the end users or sensing the environment and reporting information. With CRYSTAL, the application of the application provider is given a virtual radio. The application can be more than just an instantiation of some protocol. Even for standard protocols (e.g., Wi-Fi), the application can provide extra functionality beyond just communication (e.g., provide information about interfering signals that may be degrading the Wi-Fi performance).

In addition to interacting with end users and sensing the environment, the application may interact with other applications running in the infrastructure of the application provider (which itself could be hosted on a public cloud) via a wide area network connection. This may be used, for example, to tunnel data traffic back to the application provider to handle on their servers. The application provider may also use the tunnel as a control channel, for example, to run algorithms that optimize and guide dynamic spectrum usage. Application providers may be held responsible for monitoring and recovering from failure—whether using monitoring tools provided by the infrastructure provider or their own tools. The application provider may take different actions based on a failure by using the application programming interface (API) provided by the infrastructure provider. Some possible actions include the ability to reload software (which may be stored by the cloud manager) or release the failed node and request new resources.

As discussed earlier, an application provider may require a specific frequency or bandwidth. The CRYSTAL cloud manager then determines which CRYSTAL devices meet the requirements. Not all applications will operate within specific spectrum frequency ranges. For example, applications that use dynamic spectrum access algorithms will dynamically adjust which frequency ranges they are operating on after sensing the environment. However, even in these dynamic applications, there may be limitations based on the underlying radio hardware and other applications that are running on a given CRYSTAL device.

Discussed below is an example of how a cloud of CRYSTAL devices may be used. For this example, it will be assumed that a cellular phone provider uses a service which provides a unified application programming interface (API) for managing resources and interact with individual infrastructure providers on the cellular provider's behalf. The cellular provider already owns their own base stations that provide reasonably good coverage. In order to operate their base stations, they need to continuously monitor their network. Based on the measurements gathered from monitoring, the cellular provider adjusts how each base station is configured (e.g., how they perform beam forming) to optimize the network. Rather than deploying humans to perform the measurements, the cellular provider instead may use the CRYSTAL cloud to deploy several virtual radios in a variety of locations to collect measurements for a period of time during which adjustments are to be made—guiding both what adjustments to make as well as testing the effect of the adjustments.

At the same time, the cellular provider may have end user devices using cellular service. The cellular provider may monitor location and usage of the end user devices. Through predictive technology, it can be determined that the network is not sufficient in a particular area to meet demand (e.g., based on the previous hour's use). In response to this, the cellular provider may deploy, via the use of CRYSTAL, multiple virtual femtocells to handle the extra demand. A few hours later, if usage tails off, the provider may release some or all of the deployed femtocells. In another part of the network of the cellular provider, it may be noticed that some users in an area have poor coverage—perhaps an event is happening that brought customers to an area where the cellular provider does not run a network. The cellular provider may initially handle these users with roaming agreements with other cellular providers, but determine it is more cost effective to deploy, via the use of CRYSTAL, one or more femtocells that dynamically expand the coverage area of the cellular provider for a limited time. CRYSTAL provides a virtualized device that allows implementation of the aforementioned scenario.

FIG. 1 shows three example applications of a CRYSTAL device, which enables multiple, diverse, wireless applications to be run concurrently. Application providers may be provided with the appearance that their software is running on a dedicated device with dedicated radio hardware that is dedicated solely to the application providers. As such, an application provider may provide the entire software stack— the signal processing (i.e., waveform processing), communication protocol stack (e.g., MAC layer), and any application level (data or control) functionality that communicates over the wide area network.

In the prior art base station virtualization for a given protocol, such as Wi-Max or LTE, addresses the physical network build-out issues, but the base station is then limited to that protocol for the lifetime of the base station. Unfortunately, there is no one-size-fits-all wireless protocol. A wireless protocol intended for billions of sensors in the "Internet of Things" may prefer a low power protocol while video streaming would prefer high throughput. As discussed herein, the radio itself is virtualized and enables applications to run any protocol. The interface to CRYSTAL devices is a signal that needs to be processed by the application provider's software. While the basic parameters of a waveform are specified as part of the configuration of the virtual radio hardware, a waveform itself might have specifications for internal channelization, such as the time and frequency division of GSM signals. However, it is the responsibility of the waveform processing software in the virtual machines to handle this.

Media access control (MAC) layer functionality is used to transmit. Latency in wireless services on software radio platforms is a challenging issue. For the mobile phone standards, latency requirements have been decreasing drastically since the first data services were introduced. Aiming to support everything from GSM to LTE services, the driving round trip time (RTT) for LTE is less than 10 ms. In software radio, both the latency of the bus to move data between the hardware and software, as well as the processing time to complete the packet processing should be taken into account. In CRYSTAL, the added latency to virtualize the radio should be considered.

With CRYSTAL, the application of the application provider may perform the MAC layer functionality rather than rely on a configurable hardware MAC solution. In particular, there are multiple possibilities for hardware front-ends and more tightly-coupled systems that avoid the latency and jitter issues of buses like Ethernet and universal serial bus (USB). As such, in CRYSTAL, the application of each application provider may manage its own MAC layer with the assumption of a reasonable amount of latency to reach the underlying hardware (through the virtualization layer). The virtualization layer may incur added latency, but as shown herein, it is a reasonably low latency. This approach may be challenging, for example, in the case of Wi-Fi. The delay requirements of some 802.11 activities are within 10's of microseconds. In this situation, the use of a split-MAC system where some functionality is implemented in hardware may be used.

Software radio and software defined radio (SDR) are technologies that generally overcome the limitations of a system designed for a single protocol by either performing all signal processing in software, or using signal processing hardware that is highly configurable by a software system. Cognitive radio envisions greater intelligence, such as software-controlled dynamic adaptation of radio hardware. A significant property of cognitive radio is the ability to sense the radio's environment as part of the observe, orient, decide, and act loop (OUIDA loop). Together, these technologies enable innovation, such as advances in dynamic spectrum access (DS) which makes more efficient use of limited spectrum. Because CRYSTAL provides an abstraction layer through the PHY virtualization to the radio hardware, each virtual machine can request resources that help enable cognitive decision making. Unlike dedicated hardware systems, the radio resource allocation capabilities of CRYSTAL open up new ways of requesting and using radio spectrum awareness.

An important concern for application providers is the security of their software. For hardware that application providers own (e.g., their own base station), the application provider can restrict access to the software. However, in a CRYSTAL cloud, where the software may run on a shared and hosted infrastructure, the same measures may not be possible. In deployment scenario for CRYSTAL, where devices reside in users homes, there is considerable potential for malicious behavior, such as modifying the femtocell to enable free or anonymous calls. Fortunately, server virtualization technology provides both a flexible container for providing a complete software stack as well as isolation among virtual machines. Server virtualization technology may be used to enable the application providers to execute their custom software.

If the integrity of CRYSTAL can be guaranteed, its resource isolation model and associated security guarantees are preserved. This integrity guarantee may be addressed via remote attestation of the system software on the device by the CRYSTAL cloud manager. A hardware mechanism uses a specialized cryptographic "measurement" of the system software to verify its integrity. The result of this measurement is passed to the provider interested in the integrity of its system. The same remote attestation approach can be applied to virtual machines by the individual application providers. Software solutions for remote attestation may be used, however, telecommunications providers may prefer to leverage a hardware mechanism they have more experience with, such as the subscriber identity module (SIM) card.

Remote attestation does not prevent local hardware attacks, such as snooping on the memory bus. However, such attacks require specialized hardware and knowledge to perform, and therefore do not scale. In addition, application provider software may be structured to cope with such threats. In particular, a provider may use its own private infrastructure for any security related features that would compromise the operation of its application. For example, the network interface may be used to tunnel authentication requests to private servers of a cell phone provider to perform the authentication, rather than relying on keys resident in the memory of the CRYSTAL device.

Each virtual machine may be provided with a virtual radio device that the application may configure and use. To virtualize the PHY layer, we need an interface for the virtual machines to access that will allow the CRYSTAL system to operate various simultaneous waveforms—that is, a series of settings and optional requirements. The waveforms and networks that a CRYSTAL device may simultaneously operate may have differing radio requirements. These requirements include center frequency, bandwidth, and other hardware or transmission properties. The application running in the VM does not and should not care what underlying radio hardware system is used as long as its requirements are met. CRYSTAL therefore provides a hardware abstraction layer by offering the VMs access to a virtual radio. The virtual radio interface allows the VM to request the necessary settings. CRYSTAL's actual hardware may be much more complex, but the CRYSTAL system manages the hardware, not necessarily the VM's.

When the VM requests the frequency, bandwidth, and other parameters, the CRYSTAL device then determines how to channelize the signals across the hardware. The details for how the virtualized PHY layer is created and used are discussed in more detail herein. The task of CRYSTAL is to take these requests and figure out how to best create and handle the channel information. So the basic API exposed by CRYSTAL to the VMs is the ability to request a specific frequency with a given bandwidth. The extended API allows the VMs to set constraints on the hardware capabilities required, such as a spectral mask if there are adjacent channel interference limits to consider.

Operating a GSM-900 (at 900 MHz) and a Wi-Fi (at 2.4 GHz) signal on the same hardware platform would require analog-to-digital converts (ADCs) and digital-to-analog converters (DACs) that work at multiple gigahertz sampling rates. With CRYSTAL, requested waveforms can be partitioned among the front-ends while the VMs see only the virtualized, composite radio. An error message may be sent to the VM, if there is not an ability to properly partition the available resources. While most waveforms can be specified with just the frequency and channel bandwidth, some waveforms have additional properties to consider. One additional complexity is that some waveforms have spectrum masks for adjacent channel interference mitigation. By allowing the VM to specify the out-of-band requirements, stronger filtering may be imposed to better shape the spectrum of a transmitted channel.

Some waveforms have other constraints, extra requirements, or limitations, such as: transmitter and receiver linearity (and intermodulation products); phase noise; clock stability; and in-phase and quadrature (I&Q) imbalance. These requirements are waveform specific, and in some cases different waveforms and standards may not work with the same radio hardware. A good example is the increased linearity requirements out of a power amplifier to successfully transmit an orthogonal frequency division multiplex (OFDM) waveform. Given a waveform to transmit on a channel with a certain bandwidth, these extra requirements specify constraints placed onto the CRYSTAL system. A CRYSTAL device is aware of its resources and capable of making complex resource allocation decisions.

A benefit from virtualizing the radio hardware is a separation of the virtual radio application from the hardware that allows multiple hardware and antenna systems for different purposes. A virtualized control plane allows the system to accommodate different and upgradable radio front-ends. For example, the radio may be given a set of objectives, which may be competing with each other for resources, and it must solve the system design as a multi-objective optimization problem. Also, because the requirements here create a set of constraints, constraint based optimization can be used as an algorithm to setup and solve this problem of matching up a set of waveforms with the available hardware.

Further, a CRYSTAL cloud manager should only allocate CRYSTAL resources to a particular application provider if the resources are available. This means that a CRYSTAL device does not have to handle impossible requests (e.g., requests for frequency ranges and bandwidths that, along with the requests of other application providers, would be impossible or impractical to realize on the available radio hardware).

Part of an effective system for providing elastic overlays of standards and service providers is the need to work with channelized signals in frequency. Sharing radio hardware for different signals involves the use of the same antenna and RF front-end to handle multiple signals on different frequencies. The process of being able to receive and transmit in this context is known as channelization.

Figure 4:
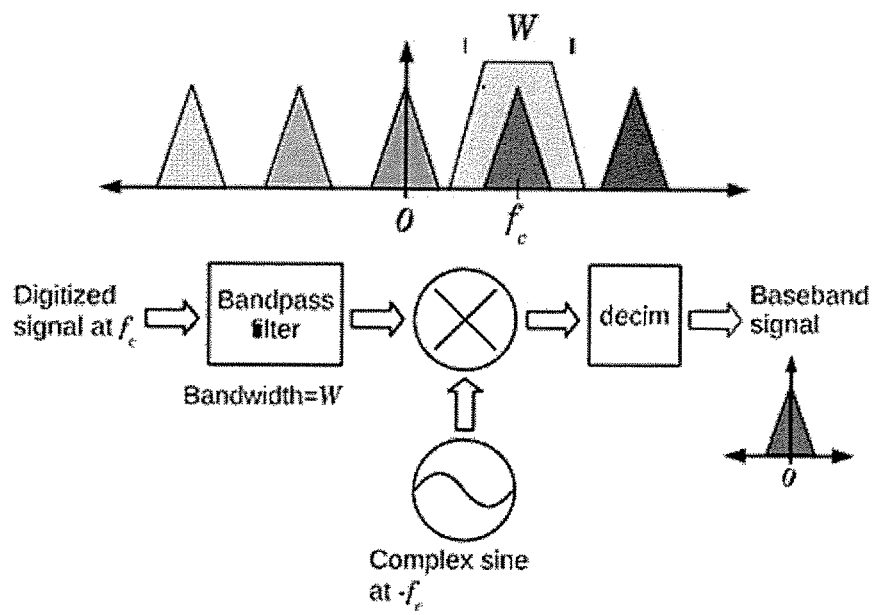
FIG. 4 is an exemplary illustration of a down-conversion process that uses a band pass filter to pass the channel of current interest.

The classic method for channelizing a signal in a receiver is to perform a frequency down-conversion. This is discussed in terms of digital baseband processing, which assumes that the signal is complex (I & Q). The common down-conversion process as illustrated in FIG. 4 involves using a band pass filter to pass only the channel of current interest followed by a complex multiply with a complex sinusoid at the center frequency of that channel. The base banded signal can now be resampled, or decimated, to a lower, more efficient sampling rate.

Figure 5:
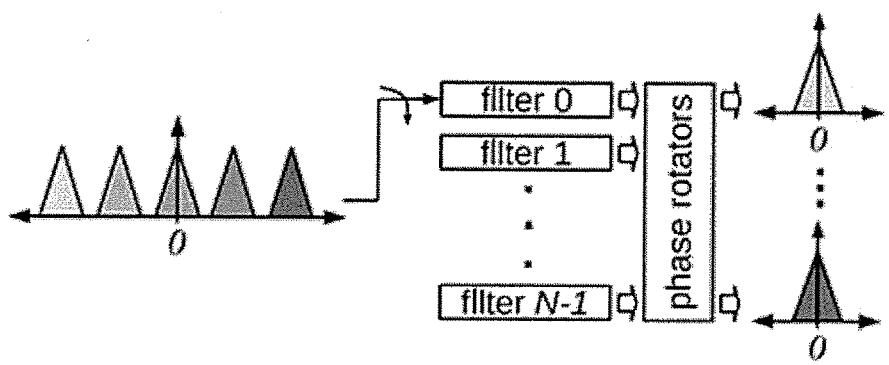
FIG. 5 illustrates a polyphase filterbank down conversion process.

Performing the filter and multiply steps when there are many channels to process is a significant duplication of effort. A more efficient method is to employ what is known as a polyphase filter bank channelizer, also known as a polyphase analysis filter. This filtering technique uses a set of filters that have a well-defined phase relationship between them. The incoming signal is inserted one sample at a time over the length of the filter bank. This process has the effect of down-sampling the signal, which aliases the channels onto baseband. A trick of this process is that each of the aliases exists with a known phase due to the implementation of the taps in the filter bank's filters. The known phase relationship of the aliased signals means that we can then rotate and sum each alias independently of the others, thereby recovering each channel as a filtered and basebanded signal. An added benefit of this technique is that each channel has also been downsampled appropriately so that the remaining system does not have to process at the higher sampling rate. The process is illustrated in a simplified diagram in FIG. 5.

A reverse of the process of channelization works to combine multiple baseband channels into a single wideband channel with the signals at different, evenly spaced center frequencies. While the channelizer is known as an analysis filter, the combining process is known as a synthesis filter. The standard analysis and synthesis filters only process fixed and equal-sized channels, which is appropriate for many applications or standards (e.g., GSM or UMTS). However, the CRYSTAL device is designed to run multiple concurrent standards or waveforms not based on a given standard or with equal channel spacings or bandwidths. This problem has already been solved in other research. As has been found in other research the combination of analysis and synthesis filters along with a perfect reconstruction filter allow us to create a system with channels of any bandwidth and signals at any center frequency.

A prototype CRYSTAL platform was created to demonstrate its power and flexibility. The prototype consisted of a number of semi-independent layers that closely mirror the layers in a traditional network stack. At the lowest level, there is the physical radio hardware that both sends and receives wireless signals. Specifically, the Ettus USRP2 software-defined radios were used along with Ettus radio frontends and antennas. The USRP2 units perform the necessary down and up-conversion of the digitized signals as well as the analog to digital conversion. The radio frontends handle the analog electromagnetic waveform processing. Ettus Research provides a variety of front-ends, each capable of sampling a different section of the frequency spectrum. Here, we use the Ettus WBX transceiver frontend, which can send and receive signals between 50 MHz to 2.2 GHz. The radio characteristics of these frontends, including the ability to sample larger portions of the frequency spectrum, continue to improve with time, meaning a single CRYSTAL device could cover many gigahertz of frequency space. As such, the physical hardware of the CRYSTAL device can handle a diverse set of wireless communications protocols.

To pass the complex, digitized waveform samples the system makes use of the USRP2 on-board Gigabit Ethernet controller; samples are encapsulated in IP packets. Moreover, users can interact with the USRP2 device via the user-space Universal Hardware Driver provided by Ettus Research. This driver provides the control and data plane functionality needed in the PHY layer, such as frequency tuning and complex data sampling.

The impetus behind making use of virtual machines as security and isolation enforcement mechanisms was outlined before. In the prototype system, the Linux Kernel based Virtual Machine (KVM) was employed, which in turn utilizes the x86 hardware virtualization extensions. The KVM infrastructure consists of a Linux management host as well as some number of guest virtual machines. In the CRYSTAL prototype, Ubuntu Desktop 10.04 i386 was used as both the host and guest operating systems inside each VM.

The Linux management host contains the CRYSTAL component (e.g., virtualization layer 113) responsible for channelizing and synthesizing the multiple signals coming in and out of each guest VM (e.g. VM 101) from user applications. This multiplexing component uses private virtual bridges to communicate with the user applications in the guest VMs. In doing so, a modification of the Universal Hardware Driver (UHD) instance was used that resides in each guest domain to communicate over an Ethernet interface. Moreover, the multiplexer communicates with the USRP2 hardware itself via a normal Gigabit Ethernet interface when transferring multiplexed data or control messages. The modifications are used since the UHD is designed to connect between an app and the USRP device. The interface was modified to provide a bridge to connect the plumbing of the application of the VM to the virtualization layer.

To accomplish the actual multiplexing, or mixing, of wireless signals from the guest VMs, both the naive complex-multiplication approach as well as the more efficient polyphase synthesizer was employed. The specific method employed during a particular CRYSTAL instantiation can be chosen at run-time with the naive complex-multiplication approach typically being more efficient for a small number of guest applications. The demultiplexing activities occur in a similar manner, but in reverse order. The major difference between the multiplexing and demultiplexing units is that the demultiplexer must track guest application frequency and bandwidth parameters to ensure the correct data is delivered to the correct guest VM.

The guest VMs host the actual user-defined radio applications. Using the modified interface bridge instead of the vanilla UHD, applications operating in these guest VMs appear to be directly attached to a USRP2. In reality, CRYSTAL used in the Linux management host is handling the hardware interfacing and providing the virtual PHY layer abstraction to the applications. It is therefore straightforward in the prototype to use applications written with the popular GNU Radio software package as a guest VM application on a CRYSTAL platform.

Figure 6:
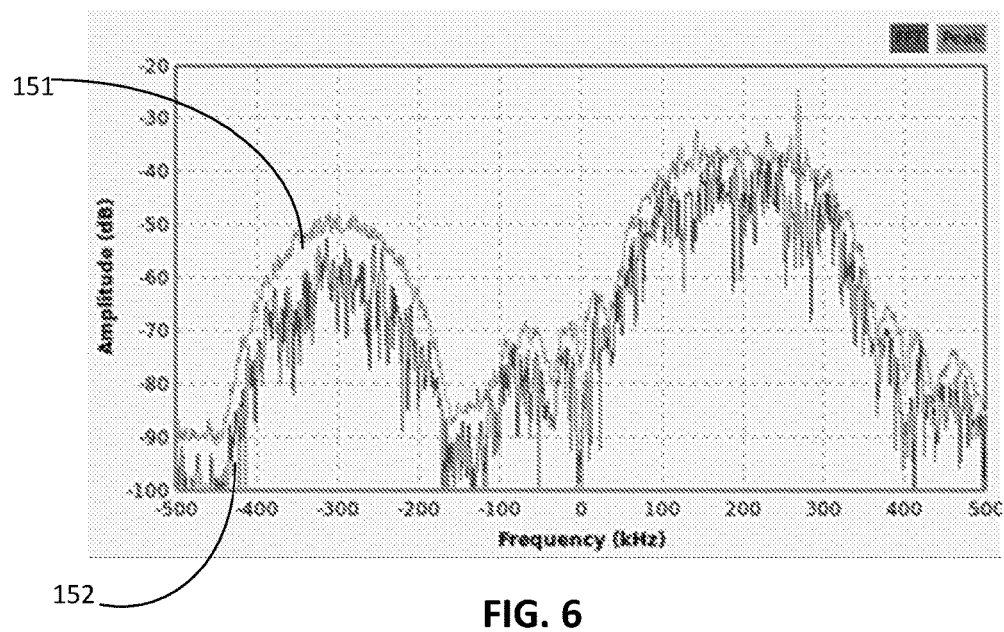
FIG. 6 illustrates the output of the spectrum analyzer showing the co-located GSM and GNU Radio virtual radio applications.

A wide variety of wireless applications already exist for the GNU Radio environment, meaning CRYSTAL supports many wireless protocols, such as GSM, without the need to write custom software. In the CRYSTAL prototype, some of these existing GNU Radio and UHD applications were integrated. In particular, experiments with three guest domains supporting three different wireless technologies—an OpenBTS GSM cell, a GNU Radio digital modulation system, and a spectrum analyzer. FIG. 6 illustrates the output of the spectrum analyzer showing the co-located GSM and GNU Radio virtual radio applications. Line 151 is the peak while line 152 is the Fast Fourier Transform (FFT).

In the first guest VM, an OpenBTS GSM cell is run. OpenBTS is an open source implementation of a GSM base transceiver station (BTS). Originally built out of GNU Radio, OpenBTS uses the USRP hardware front end to create a GSM base station that operators can run on a standard computer. OpenBTS runs the over-the-air GSM standard and uses Asterisk to route call information. This combination allows calls through an OpenBTS system to connect through to the rest of the telephony system if connected to a PBX (private branch exchange) provider or other hardware solution. Unlocked mobile phones can then connect to an OpenBTS as though it were any other base station of GSM service provider.

In the prototype system, information on the SIM cards in unlocked GSM handsets was modified, allowing the unlocked handsets to connect to the CRYSTAL base station as though it were a traditional, hardware-based cellphone tower. In deployed versions of CRYSTAL, SIM cards of handsets would not need to be modified in order to connect, because operators would have their own software defined radio-based BTS systems running on an isolated VM.

In the second guest VM, a digital waveform application of GNU Radio is run. Originally built to communicate directly with the USRP devices and recently updated for UHD support, these transmit and receive example applications were repurposed for use with CRYSTAL. This setup allows specifying different digital waveform settings and then running packetized data between multiple USRPs. This digital application has the benefit of being very flexible to allow adjusting parameters like the modulation and bandwidth that enables the capabilities of CRYSTAL to be explored.

In the third guest VM, a simple Fast Fourier Transform (FFT)-based spectrum analyzer is installed, which provides a view of the RF activities of the other guest domains, as well as of the surrounding RF environment itself. GNU Radio provides this application as part of its basic package. Unlike that of the other two domains, the FFT application receives waveform data (no transmission occurs). Moreover, rather than receiving a bandpass-filtered and rate-converted signal from the CRYSTAL software in the Linux management host, the analyzer is provided with all data as received by the USRP2 unit. In this manner, the analyzer can view, but not modify, the operation of other active guest applications. There are situations where even knowledgeable home users have difficulty locating (and obtaining good throughput from) their Wi-Fi routers, for example, due to interference. A spectrum analyzer could aid in placing an access point, but was not practical until now.

At least three properties are demonstrated and in combination serve as a basis for dynamically deployable wireless infrastructures. First, the virtualization provides good isolation for the virtual radios. Second, the latency measurements independently confirm previous results and demonstrate the ability to correctly support applications such as 3G cellular telephony. Finally, even an unoptimized CRYSTAL implementation is scalable to a reasonable number of virtual radio applications.

Each of the following experiments utilizes the same hardware configuration. Two Ettus USRP2 units are used: one fed by the polyphase synthesis multiplexer and one feeding the polyphase channelizer. The transmitting USRP2 unit features a WBX daughtercard, while the receiver uses a RFX-1800 card. Both cards are transceivers that can use the 2 GHz center frequency used in the experiments. To minimize interference from external sources, there was a direct connection of the radios with shielded coaxial cabling. The radio application used for the experiments is a modified version of the digital-bert application distributed with the GNU Radio source code. The application runs the digital modulation waveforms through a bit error rate test (BERT) program.

CRYSTAL is designed to support multiple concurrent radio applications by allocating spectrum resource based on requested bandwidth and center frequencies. The isolation between the allocated signals should be evaluated so that it can be determined how close the frequencies can be spaced and whether the full range of frequencies can be supported by the radio hardware.

This first experiment used the GNU Radio digital modulation capabilities to generate two signals from different VMs. Each signal is a root-raised cosine shaped BPSK with a bit rate of 250 kbps and a roll-off factor of 0.35, which results in an occupied bandwidth of 337.5 kHz. CRYSTAL channelized these two signals over a 10 MHz bandwidth provided by the USRP2.

Figure 7:
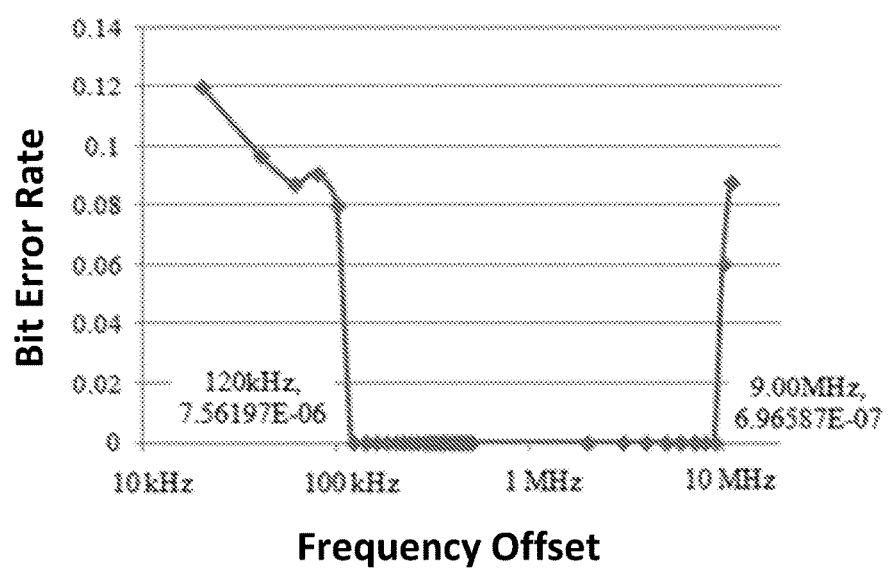
FIG. 7 illustrates the impact of frequency separation between two virtual machine applications.

As shown in FIG. 7, the bit error rate (BER) does not increase until the frequency separation is below 120 kHz. This makes sense, as this is the point when the information content of the two signals, as opposed to the excess bandwidth from the pulse shaping, begin to overlap in frequency. From this result, it can be concluded that no interference results from the CRYSTAL software itself and that isolation in the channelizer produces no significant adjacent channel interference. Only when signals physically overlapped did the interference create problems.

The increased BER that occurs on the far end of FIG. 7 is due to the roll-off of the filters in the radio processing chain. It is not uncommon to lose some bandwidth to filter roll-off and many accept the outer edges, about ±10%, of a radio's bandwidth as unusable. These results illustrate that issue.

The second isolation experiment consists of four individual tests. In the first test, a single 250 kbps BPSK channel was created through CRYSTAL and its BER was measured. In the second test, an additional CRYSTAL channel was added directly adjacent to the first, but no application was connected to this new channel. In the third test, a narrowband FM (NBFM) signal was connected to the second channel, placing the signal at the transition band between the two channels. Finally, in the fourth test, the same signal layout as in the third test was produced, but with use of the GNU Radio only and interfaced directly with the USRP2 from the application. In this last test, we frequency shifted the NBFM signal to transmit both from the same USRP2.

Table 1 shows the BER recorded in each of these four tests. As can be seen from the data, the BER remains nearly constant in each. The BERs shown here at 10-6 are relatively close. This identifies a few properties of the CRYSTAL system. In going from test 1 to test 2 we can see that the added signal processing done by CRYSTAL has no effect on the fidelity of the communications. Comparing test 2 to test 3 reiterates the results shown in FIG. 7 that show the isolation capabilities of CRYSTAL's channelization. Test 4 is a tailor-made GNU Radio application for transmitting multiple signals. Logically, this is the same test as in test 3 with the distinction being that the channelization is setup to transmit both waveforms from two different applications. The synthesis and channelization performed by CRYSTAL introduces no undue bit errors and the channels remain sufficiently isolated.

TABLE 1

Resource sharing experiment results.

| Test | Ch. 1 | Ch. 2 | BER ($\times 10^{-6}$) |
|---|---|---|---|
| CRYSTAL 1 | BPSK | N/A | 3.248 |
| CRYSTAL 2 | BPSK | empty | 3.346 |
| CRYSTAL 3 | BPSK | NBFM | 3.517 |
| GNU Radio | BPSK | NBFM | 3.649 |

The latency between when an antenna receives a signal to when the signal is processed is critical for supporting most digital wireless standards. To provide virtualization of the radio hardware, CRYSTAL performs some signal processing in the management host, which incurs added latency. Specifically, the latency is added in the channelization performed in the host domain, as well as the communications channel between the guest VMs and the host. To quantify this effect, round trip times (RTT) were compared to the USRP2 unit from within a guest VM with the RTTs from the host. The USRP2 firmware implements a ping utility, which allows for collection of such timing information. The latency induced by GNU Radio alone was measured to determine what portion of the latency can be attributed directly to CRYSTAL.

TABLE 2

Latency thru CRYSTAL and thru a GNU Radio application

| | GNU Radio | CRYSTAL |
|---|---|---|
| Latency Average (us) | 552.5 | 258.5 |
| Latency Minimum | 523.0 | 195.0 |
| Latency Maximum | 593.5 | 596.0 |

Table 2 shows results of latency through CRYSTAL software and through a GNU Radio application. CRYSTAL introduces an added latency of 258.5 us. Thus, the system is well within the maximum latency required by the LTE specifications (10 ms). Taking into account the native GNU Radio latency of 552 us, CRYSTAL still has an RTT of about 1 ms, meaning that the requirements of LTE and other 3G standards can be met.

These results are encouraging, as potential is seen for great improvement in this regard. CRYSTAL is implemented in user space, and therefore incurs extra latency from two transitions between kernel space and user space. Also, communication between CRYSTAL and the guest VM makes use of Linux bridging. A less-costly approach would be to provide direct communication through a modified UHD driver. So while the latency numbers are already reasonable in comparison to specification requirements, these numbers can be reduced even further, giving the VM applications more time to process the signals. Thus, these numbers show that we can provide a virtualized software platform for 3G systems.

Figure 8:
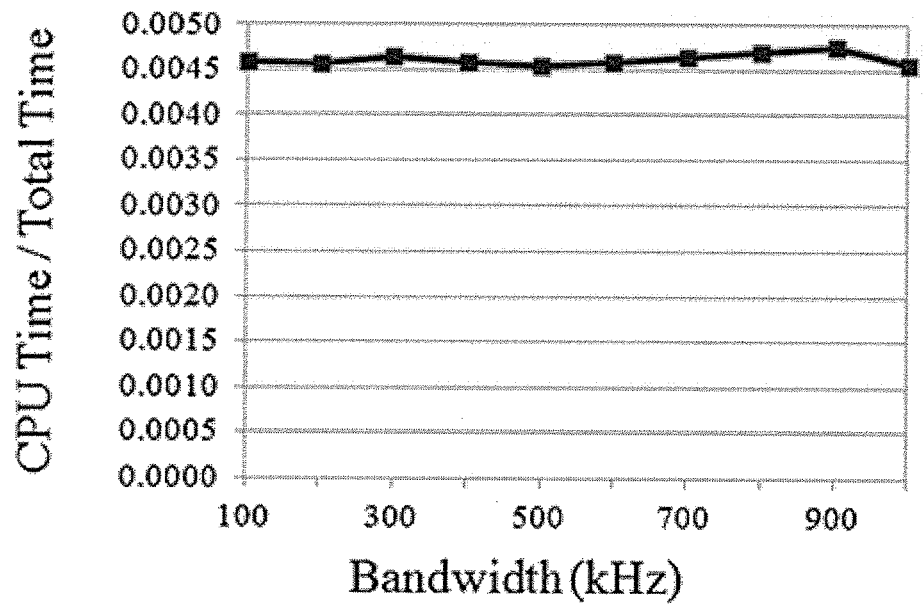
FIG. 8 illustrates Bandwidth versus CPU Time/Total time.

In addition to isolation and latency, scalability and processor resource utilization are also a concern. The workload within a virtual radio application should not impact the computational requirements of the PHY virtualization software. Similarly, the processing requirements of the PHY virtualization software should scale with the number of virtual radio applications. To show this is the case, first the workload undertaken within a virtual radio application is varied. Specifically, the bandwidth used by a single application is varied in a single guest VM. As shown in FIG. 8, this variation has no significant impact on the CPU utilization of the CRYSTAL software in the host. Therefore, while the virtual machine's computational load may increase due to higher bandwidth requirements, the virtualization layer remains relatively unaffected.

Figure 9:
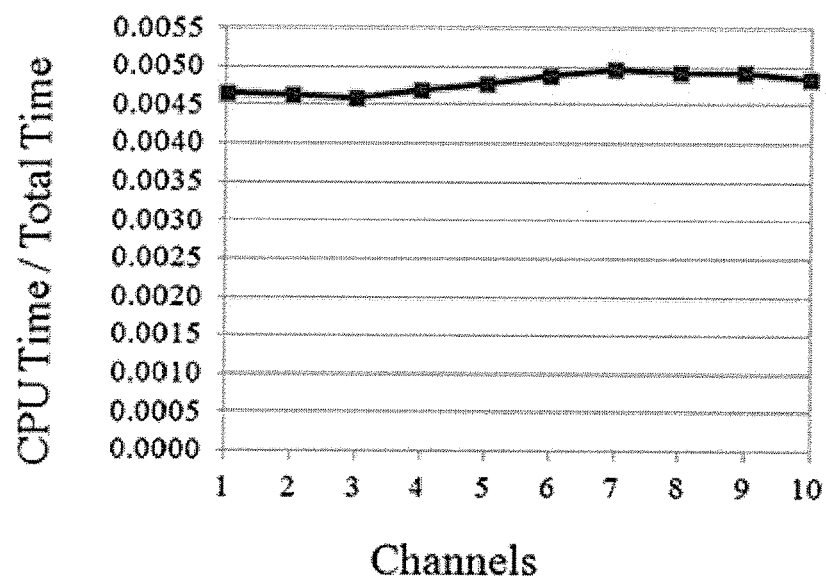
FIG. 9 illustrates the impact of number of virtual radio applications on the processing load of a device that has a cognitive radio you share, trust and access locally.

Similarly, the number of virtual radio applications connected to CRYSTAL were varied, while holding the application waveforms, and therefore the computational needs of each of the VMs, constant. As shown in FIG. 9, the CPU utilization in the management host remains low and largely unaffected. This consistency indicates that the number of VMs has little effect on the CRYSTAL software performance.

Figure 10:
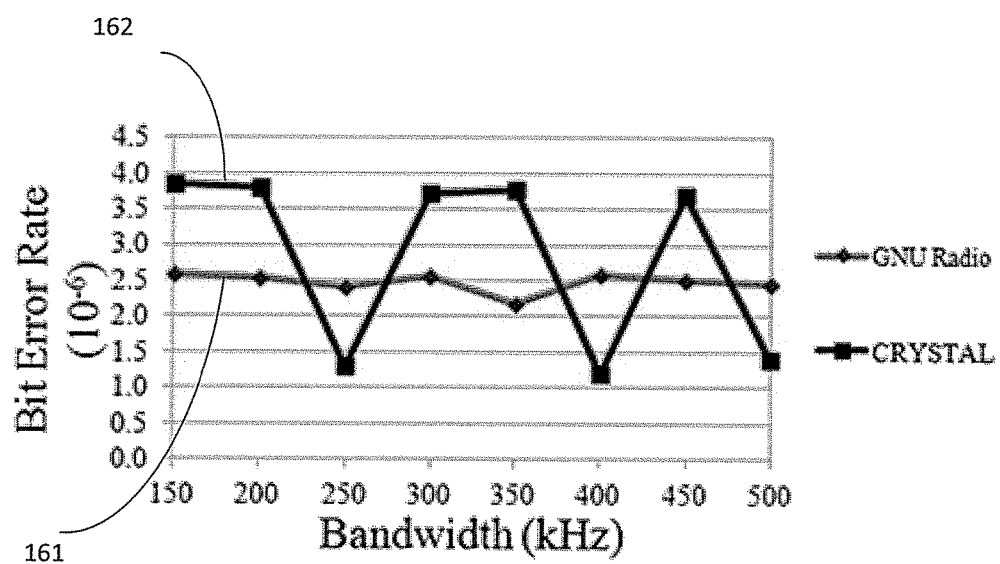
FIG. 10 illustrates the impact of symbol rate on bit error.

To further show the scalability of the system, an additional experiment was performed, this time focusing on the BER experienced by an application as its computational load increases. A BPSK signal was created in a single guest VM. Then the bit rate was increased, and therefore the bandwidth, of this BPSK channel, boosting its resource usage. FIG. 10 shows that, while the resulting BER through CRYSTAL represented by line 162 changes slightly, it remains consistently around the same value.

FIG. 10 also provides the BER resulting from a native GNU Radio implementation of identical BPSK channels represented by line 161. The fact that the average BER from an application remains fairly constant as its computational needs increase indicates CRYSTAL is robust to the resource usage of its connected application. Moreover, the fact that the average BER through CRYSTAL (162) closely mirrors that through a direct connection between application and radio in a native GNU Radio environment further bolsters the claims mentioned herein. The GNU Radio application produces the same energy per bit regardless of the symbol rate, so the Eb/NO (energy per bit to noise spectral density) does not change, so we expect a constant BER.

For CRYSTAL to be effective, there is also a desire to overcome some of the challenges of deploying access points. Importantly, this only has to occur once, rather than for each new carrier and standard as is the case today. As discussed in before, spatially reusing spectrum can achieve large gains in capacity. For a given base station, all end user devices within range of the base station may share the spectrum. Rather than large base stations covering a large area, greater capacity may be achieved with many smaller cells that each cover smaller areas, but in aggregate cover the same large area.

A large installed base of small cells may be achieved through a deployment to individual residences and businesses. The success of Fon in deploying a wide-spread Wi-Fi network by relying on end users is a prime example suggesting this is possible. Fon in this case serves the role of both the infrastructure provider managing the virtualized access points and the wireless service provider providing service to end users. As a second example, Verizon, a wireless service provider, purchased spectrum from a joint venture of several cable companies where in return, the cable companies have the option of selling Verizon Wireless service. Effectively, by being brokers for wireless services, Internet service providers can realize the goal of not simply being a bit pipe provider. For example, Verizon plays both the role of cloud infrastructure provider and Internet service provider, and as such, are in a position to expand the cloud offering to include wireless access points as well—simply by providing a different wireless router than the one they currently do. An enterprise might, for example, use this to enable their employees to efficiently and securely access that enterprise's cloud services from anywhere in the town the company is located.

A study was conducted of the economic benefits to a cellular provider for deploying small cells in homes in a city of 200K with 65K homes. It shows, for example, that for an operator with 40% market share, only 20% of its customers must have home base stations deployed to satisfy 80% of the total demand from all its customers. The remaining customers can be covered by an umbrella base station, providing a much more economical network. While focused on voice communication in a cellular network, the general coverage trends are largely applicable to the deployment scenario herein.

Discussed herein are the goals, design, and implementation of CRYSTAL, a virtualized cognitive access point. The implementation of CRYSTAL on the GNU Radio/USRP showed that robust resource isolation can be achieved, providing a basis for seamlessly combining multiple wireless access applications on a single hardware platform. The measured latencies show that radios such as 3G devices can be supported. CRYSTAL platforms can be aggregated and managed as a cloud, providing a new model for access point sharing, control and management. CRYSTAL may be used for scenarios such as neighborhood spectrum management. CRYSTAL uses software radio technology in combination with virtualization to provide concurrent use of a common RF infrastructure. Here, the entire radio is virtualized, rather than a given protocol.

Figure 11:
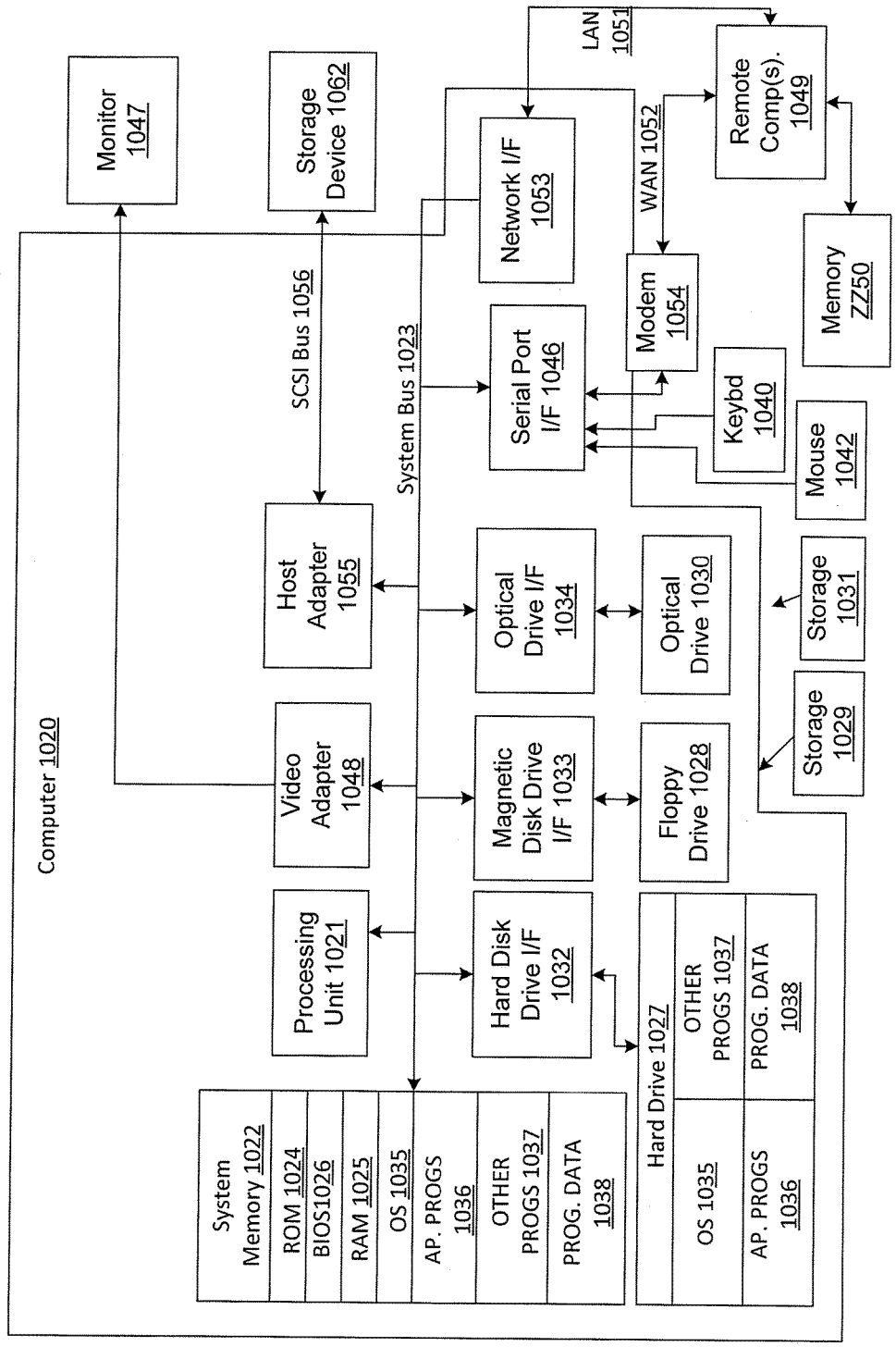
FIG. 11 is an exemplary block diagram representing a general purpose computer system in which aspects of the methods and systems disclosed herein or portions thereof may be incorporated.

FIG. 11 and the following discussion are intended to provide a brief general description of a suitable computing environment in which the methods and systems disclosed herein and/or portions thereof may be implemented. Although not required, the methods and systems disclosed herein is described in the general context of computer-executable instructions, such as program modules, being executed by a computer, such as a client workstation, server or personal computer. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. A processor may be implemented on a single-chip, multiple chips or multiple electrical components with different architectures. The methods and systems disclosed herein may also be practiced in distributed computing environments where tasks are performed by remote processing devices that are linked through a communications network. In a distributed computing environment, program modules may be located in both local and remote memory storage devices.

FIG. 11 is a block diagram representing a general purpose computer system in which aspects of the methods and systems disclosed herein and/or portions thereof may be incorporated. As shown, the exemplary general purpose computing system includes a computer 1020 or the like, including a processing unit 1021, a system memory 1022, and a system bus 1023 that couples various system components including the system memory to the processing unit 1021. The system bus 1023 may be any of several types of bus structures including a memory bus or memory controller, a peripheral bus, and a local bus using any of a variety of bus architectures. The system memory includes read-only memory (ROM) 1024 and random access memory (RAM) 1025. A basic input/output system 1026 (BIOS), containing the basic routines that help to transfer information between elements within the computer 1020, such as during start-up, is stored in ROM 1024.

The computer 1020 may further include a hard disk drive 1027 for reading from and writing to a hard disk (not shown), a magnetic disk drive 1028 for reading from or writing to a removable magnetic disk 1029, and an optical disk drive 1030 for reading from or writing to a removable optical disk 1031 such as a CD-ROM or other optical media. The hard disk drive 1027, magnetic disk drive 1028, and optical disk drive 1030 are connected to the system bus 1023 by a hard disk drive interface 1032, a magnetic disk drive interface 1033, and an optical drive interface 1034, respectively. The drives and their associated computer-readable media provide non-volatile storage of computer readable instructions, data structures, program modules and other data for the computer 1020. As described herein, computer-readable media is a tangible article of manufacture and thus not a signal per se.

Although the exemplary environment described herein employs a hard disk, a removable magnetic disk 1029, and a removable optical disk 1031, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 1029, optical disk 1031, ROM 1024 or RAM 1025, including an operating system 1035, one or more application programs 1036, other program modules 1037 and program data 1038. A user may enter commands and information into the computer 1020 through input devices such as a keyboard 1040 and pointing device 1042. Other input devices (not shown) may include a microphone, joystick, game pad, satellite disk, scanner, or the like. These and other input devices are often connected to the processing unit 1021 through a serial port interface 1046 that is coupled to the system bus, but may be connected by other interfaces, such as a parallel port, game port, or universal serial bus (USB). A monitor 1047 or other type of display device is also connected to the system bus 1023 via an interface, such as a video adapter 1048. In addition to the monitor 1047, a computer may include other peripheral output devices (not shown), such as speakers and printers. The exemplary system of FIG. 11 also includes a host adapter 1055, a Small Computer System Interface (SCSI) bus 1056, and an external storage device 1062 connected to the SCSI bus 1056.

The computer 1020 may operate in a networked environment using logical connections to one or more remote computers, such as a remote computer 1049. The remote computer 1049 may be a personal computer, a server, a router, a network PC, a peer device or other common network node, and may include many or all of the elements described above relative to the computer 1020, although only a memory storage device 1050 has been illustrated in FIG. 11. The logical connections depicted in FIG. 11 include a local area network (LAN) 1051 and a wide area network (WAN) 1052. Such networking environments are commonplace in offices, enterprise-wide computer networks, intranets, and the Internet.

When used in a LAN networking environment, the computer 1020 is connected to the LAN 1051 through a network interface or adapter 1053. When used in a WAN networking environment, the computer 1020 may include a modem 1054 or other means for establishing communications over the wide area network 1052, such as the Internet. The modem 1054, which may be internal or external, is connected to the system bus 1023 via the serial port interface 1046. In a networked environment, program modules depicted relative to the computer 1020, or portions thereof, may be stored in the remote memory storage device. It will be appreciated that the network connections shown are exemplary and other means of establishing a communications link between the computers may be used.

Computer 1020 may include a variety of computer readable storage media. Computer readable storage media can be any available media that can be accessed by computer 1020 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1020. Combinations of any of the above should also be included within the scope of computer readable media that may be used to store source code for implementing the methods and systems described herein. Any combination of the features or elements disclosed herein may be used in one or more embodiments.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A system comprising:
   a shared wireless device comprising:
   a shared wireless device processor; and
   a shared wireless device memory coupled with the shared wireless device processor, the shared wireless device memory having stored thereon executable instructions that when executed by the shared wireless device processor cause the processor to effectuate operations comprising:
   creating a first virtual machine comprising a first virtual radio application with a first radio stack and a corresponding first operating system;

creating a second virtual machine comprising a second virtual radio application with a second radio stack and a corresponding second operating system, wherein the first virtual machine and the second virtual machine are logically separate and distinct;

creating a third virtual machine comprising a third virtual radio application with a third radio stack and a corresponding third operating system, wherein third virtual machine is a sensor that provides information about interfering signals that are degrading the performance of the first virtual radio application or the second virtual radio application; and channelizing wireless signals, via a virtualization layer, based on a polyphase approach, wherein:
the virtualization layer is communicatively connected with the first virtual machine and the second virtual machine, and
the wireless signals are received from the first virtual machine and the second virtual machine; and communicating the wireless signals to a single radio antenna of the device, wherein the single antenna is the sole antenna for use of the first virtual radio application and the second virtual radio application; and a cloud manager device communicatively connected with the shared wireless device, the cloud manager device comprising:
a cloud manager device processor; and
a cloud manager device memory coupled with the cloud manager device processor, the cloud manager device memory having stored thereon executable instructions that when executed by the cloud manager device processor cause the cloud manager device processor to effectuate operations comprising:

receiving, by an application provider device, a request that comprises features for a mobile device that comprises a location and an antenna direction and managing, based on the request, configurations of the shared wireless device associated with a plurality of wireless devices, wherein each wireless device of the plurality of wireless devices comprises a plurality of virtual radio applications, the plurality of virtual radio applications comprise the first virtual radio application, the second virtual radio application, and the third virtual radio application.

2. The system of claim 1, wherein the first virtual machine sends a request of a first spectral mask to the virtualization layer.

3. The system of claim 1, wherein the cloud manager device processor effectuate further operations comprising:
providing, based on the request, a response to the application provider device that lists the shared wireless device.

4. The system of claim 1, wherein the cloud manager device processor effectuate further operations comprising:
providing, based on the request, instructions to the shared wireless device to create the first virtual radio application.

5. The system of claim 1, wherein the first virtual radio application is a spectrum analyzer application that detects interference sources.

6. The system of claim 1, wherein the second virtual radio application is at least a Worldwide Interoperability for Microwave Access (WiMax).

7. The system of claim 1, wherein the plurality of virtual radio applications comprise General Packet Radio Services.

8. The system of claim 1, wherein the plurality of virtual radio applications comprise wireless fidelity (Wi-Fi).

9. The system of claim 1, wherein the second virtual radio application is long term evolution (LTE).

* * * * *

UNITED STATES PATENT AND TRADEMARK OFFICE
CERTIFICATE OF CORRECTION

PATENT NO. : 10,223,139 B2  
APPLICATION NO. : 14/212975  
DATED : March 5, 2019  
INVENTOR(S) : Smith et al.

It is certified that error appears in the above-identified patent and that said Letters Patent is hereby corrected as shown below:

In the Drawings

In FIG. 11, replace the text within the box "MEMORY ZZ50" with -- MEMORY 1050 --.

In the Specification

In Column 3, Line 20: Replace "illustrates" with -- illustrates the --.

In Column 15, Line 39: Replace "in" with -- herein --.

In the Claims

In Column 20, Claim 1, Line 3: Replace "direction" with -- direction; --.

Signed and Sealed this  
Twenty-seventh Day of August, 2019

Andrei Iancu  
*Director of the United States Patent and Trademark Office*